US006496345B1

(12) United States Patent
Smith

(10) Patent No.: US 6,496,345 B1
(45) Date of Patent: Dec. 17, 2002

(54) CURRENT REGULATION WITH LOW ON RESISTANCE IN OVERDRIVEN MODE

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/685,434

(22) Filed: Oct. 10, 2000

(51) Int. Cl.[7] .................................................. H02H 9/08
(52) U.S. Cl. ........................ 361/93.9; 323/908; 323/277
(58) Field of Search ................................. 323/277, 274, 323/303, 265, 273, 908; 361/115, 100, 93.1, 93.9, 57, 58

(56) References Cited

U.S. PATENT DOCUMENTS 4,322,675 A * 3/1982 Lee et al. ................... 323/277
5,436,824 A * 7/1995 Royner et al. ................ 363/89
5,765,460 A * 6/1998 Perillo et al. ................. 361/18
5,850,137 A * 12/1998 Takimoto et al. ........... 320/164
6,201,674 B1 * 3/2001 Warita et al. ................. 361/18
6,285,539 B1 * 9/2001 Kashimoto et al. ......... 323/908

* cited by examiner

*Primary Examiner*—Robert E. Nappi
*Assistant Examiner*—Gary L. Laxton
(74) *Attorney, Agent, or Firm*—Merchant & Gould P.C.; John W. Branch

(57) ABSTRACT

A circuit for regulating current is disclosed. The circuit includes a current sensor, a controller, and a current limiter. The current sensor is formed from resistance inherent to the current limiter. The controller receives a signal from the current sensor and sends a control signal to the current limiter. The current limiter responds to the control signal by limiting current, if necessary, through the circuit.

25 Claims, 5 Drawing Sheets

CURRENT REGULATION WITH LOW ON RESISTANCE IN OVERDRIVEN MODE

FIELD OF THE INVENTION

The present invention relates to electronic circuits and, more particularly, to electronic circuits that regulate current.

BACKGROUND

Battery powered electronic devices often include components for monitoring the current to and from a battery pack. This is typically done by putting a sense resistor in the path between the battery pack and the load and also between the charging unit and the battery pack. Then, a regulating circuit measures the voltage across the sense resistors and limits the current to or from the battery pack accordingly. This limiting is typically performed by using a transistor in the current path from the battery pack to the load or charging unit and by causing the transistor's control terminal to be driven in response to the voltage across the sense resistor.

With battery and non-battery powered devices, often a main goal is to lose as little voltage as possible across the regulating circuitry when not limiting current. With typical current regulators, voltage is lost in two places: as current flows through the sense resistor and as current flows through the transistor. Consequently, when not limiting current in order to avoid wasting power or generating heat, it is desired that the resistance of the sense resistor and the resistance of the transistor be as low as possible for the area available for these components.

A transistor exhibits low resistance when its control terminal is held at a voltage appropriate to turn the transistor "full on." In current regulating circuitry, this is often accomplished through the use of an amplifier coupled to the sense resistor with the amplifier output driving the control terminal of the transistor. With the appropriate choice of sense resistor and amplifier characteristics, the current regulating circuitry can be constructed such that for currents less than a regulation current limit, the amplifier drives the control terminal of the transistor to a full on state. As current through the sense resistor increases above the regulation current limit, the amplifier drives the control terminal of the transistor to reduce the current to the regulation current limit. This has the effect of providing little resistance when current passing through the regulating circuitry is less than the regulation current limit and provides the appropriate amount of resistance through the transistor to limit the current to the regulation current when a load tries to draw an excess amount of current.

Dealing with the resistance of the sense resistor, however, is more problematic. For example, when one desires to have a regulation current limit of one amp and needs to have less than 10% error, a sense resistor in series with a transistor needs to be at least 20 milliohms to provide sufficient feedback to the amplifier. With one amp of current flowing through the sense resistor, 20 milliwatts of power loss is generated. Besides the excess heat that this power loss generates, this amount of power loss is unacceptably high for many applications. Furthermore to build such a resistor on an integrated circuit that can tolerate such a high current requires a great deal of real estate.

SUMMARY

In accordance with the present invention, there is provided an apparatus for regulating current. The apparatus uses a current limiter in the current path to or from a power source to limit the current passing through the current path to a selected amount. Instead of using an external sense resistor, the apparatus uses a portion of the resistance inherent in the current limiter to provide feedback to circuitry regulating the current.

In one aspect, an internal conductive material of the current limiter is tapped at one point to provide feedback to circuitry regulating the current.

In another aspect, an internal conductive material of the current limiter is tapped at several points and circuitry is added which allows the feedback provided to the regulating circuitry to be dynamically selected.

Because these aspects of the invention use resistance inherent to the current limiter to provide feedback, the current regulating circuitry is able to avoid the voltage loss associated with current passing through a sense resistor external to the current limiter. Removing the external sense resistor also avoids the heat generated by the current that would pass through it. Eliminating the external sense resistor reduces the amount of chip real estate that would be used to create a resistor capable of carrying a relatively large amount of current, thus decreasing costs of fabrication and allowing other components to be constructed in valuable chip real estate.

DETAILED DESCRIPTION

Figure 1:
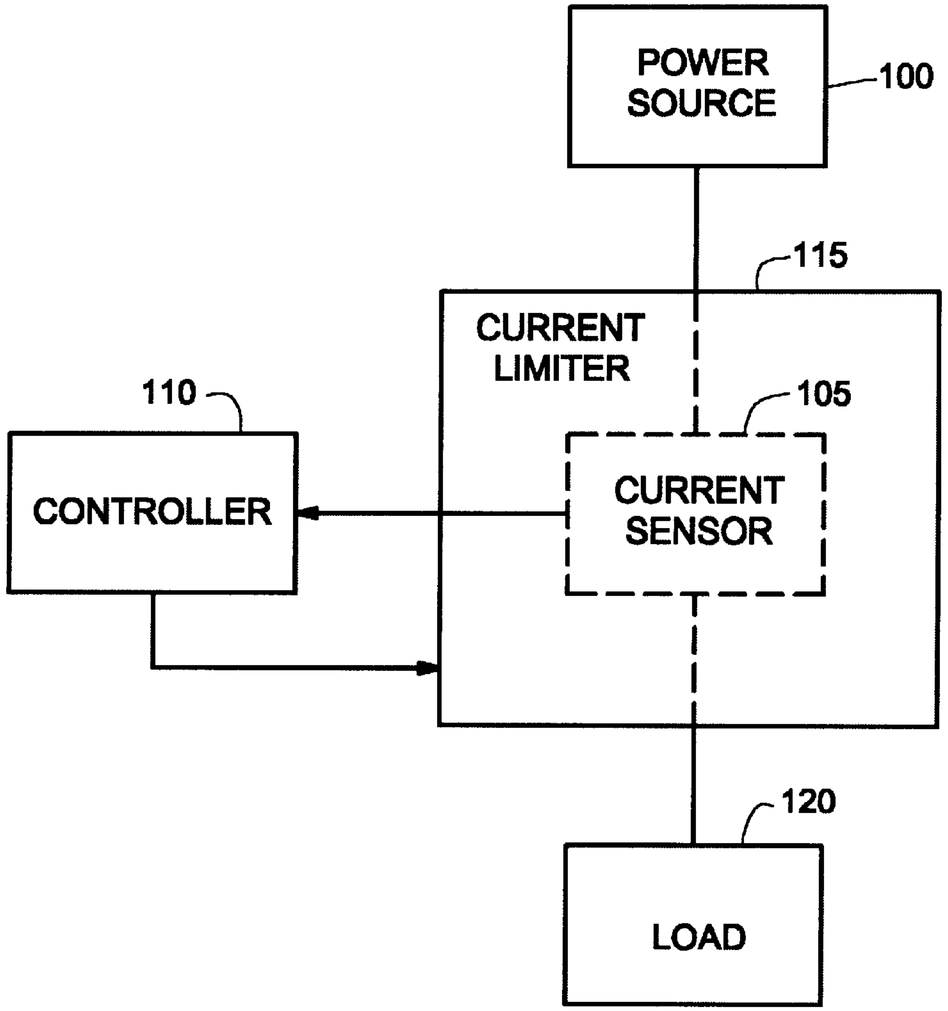
FIG. 1 is a simplified functional block diagram of a controller responding to a signal from a current sensor by driving a current limiter to limit, when necessary, power delivered from a power source to a load, according to one embodiment of the invention.

FIG. 1 is a simplified functional block diagram including power source 100, current sensor 105, controller 110, current limiter 115, and load 120, according to one embodiment of the invention. Power source 100 supplies current to current limiter 115. Current sensor 105 is formed from a structure used to create current limiter 115 and avoids the need for an external current sensor. Part of the current supplied to current limiter 115 passes through current sensor 105 which sends a signal proportional to the current sensed to controller 110. Controller 110 responds to the signal sent by sending a control signal to current limiter 115. Current limiter 115 responds to the control signal sent from controller 110 by allowing an appropriate amount of current to reach load 120.

In one embodiment of the invention, all of the components of FIG. 1 are implemented on one monolithic integrated circuit. In other embodiments of the invention, some of the components of FIG. 1 are implemented on one or more monolithic integrated circuits while other components are implemented on one or more discrete devices. The components are then coupled to implement the functions of FIG. 1. Some embodiments of the invention are implemented solely with discrete components coupled together while other embodiments are implemented solely with monolithic integrated circuits coupled together. In all embodiments of the invention, however, current sensor 105 is formed from a structure of current limiter 115 and consequently resides on the same component.

In embodiments of the invention, controller 110 is as simple as an amplifier or as complicated as microprocessor. In other embodiments, controller 110 is coupled to a microprocessor or other control logic. In embodiments where the controller is part of a microprocessor or coupled to a microprocessor or other logic circuitry, controller 110 could be configured such that it provided a complex set of control signals to current limiter 115 to limit current reaching load 120.

Figure 2:
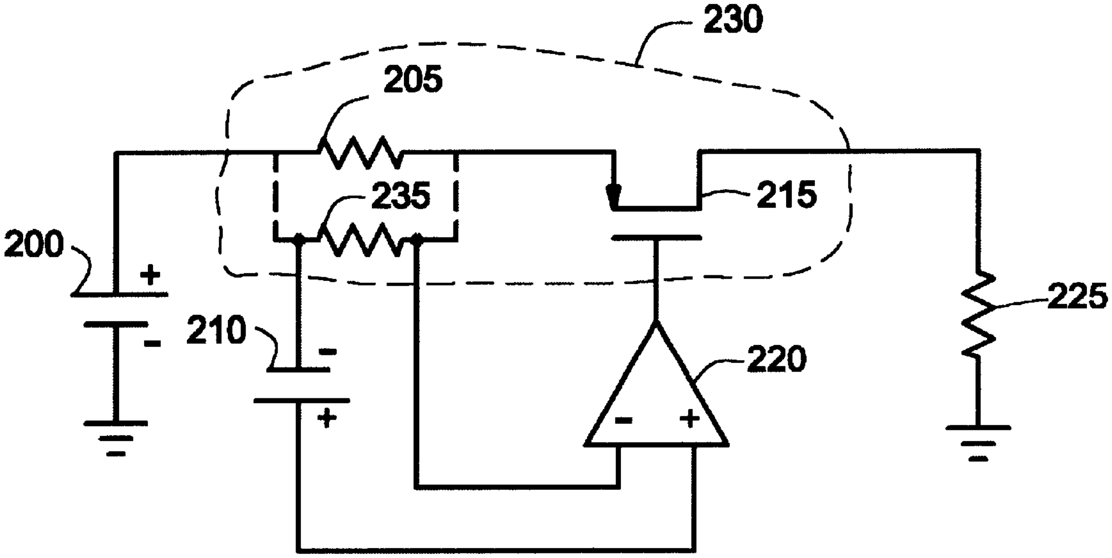
FIG. 2 is a circuit diagram of a circuit implementing the block diagram of FIG. 1, according to one embodiment of the invention.

FIG. 2 shows a circuit constructed to implement the functions of FIG. 1, according to one embodiment of the invention. FIG. 2 includes power source 200, voltage source 210, transistor 230, amplifier 220, and load 225. Transistor 230 includes internal resistance 205 and field effect structure 215. Part of internal resistance 205 is used as sense resistor 235 rather than using a separate resistor external to transistor 230. How one embodiment of sense resistor 235 is formed is described in conjunction with FIGS. 3 and 4.

The circuit is connected as follows. One terminal of power source 200 is grounded, while the other terminal is connected to the source terminal of transistor 230. The first terminal of voltage source 210 is connected to a first terminal of sense resistor 235, while the second terminal of voltage source 210 is connected to the positive input terminal of amplifier 220. A second terminal of sense resistor 235 is connected to the negative input terminal of amplifier 220. The output terminal of amplifier 220 is connected to the gate of transistor 230. The drain of transistor 230 is connected to a first terminal of load 225. A second terminal of load 225 is grounded.

The circuit operates as follows. Power source 200 supplies current to transistor 230. Part of the current passes through sense resistor 235 which sends a signal to amplifier 220. Amplifier 220 responds to the signal from sense resistor 235 by varying the control terminal voltage on transistor 230. As long as the current passing through transistor 230 is less than a selectable current regulation limit, the amplifier drives the transistor control terminal such that the transistor is full on. This causes transistor 230 to have a low resistance thereby causing more signal to reach load 225 than if transistor 230 was acting in a linear or subthreshhold region. In this embodiment, when the current passing through sense resistor 235 causes the voltage across resistor 235 to be equal to or greater than voltage source 210, amplifier 220 begins to drive the control terminal of transistor 230 such that transistor 230 limits the current reaching load 225.

Specifically, amplifier 220 operates to keep its input terminals at the same voltage, if possible. To keep its terminals at the same voltage potential, enough current must flow through sense resistor 235 to offset voltage source 210. When less current than this flows through sense resistor 235, amplifier 220 tries to compensate by turning transistor 230 fill on. This, however, may still not reduce the overall resistance between voltage source 200 and ground enough to cause sufficient current to flow through sense resistor 235 to make the input terminals of amplifier 220 be the same voltage potential. This would occur, for example, if the load resistance was too large to draw the current regulation limit. In this case, the amplifier continues to drive the transistor full on, thus providing a low voltage drop across transistor 230.

Once current through sense resistor 235 exceeds that needed to cause the terminals of amplifier 220 to be at the same voltage potential, amplifier 220 operates by driving the control terminal of transistor 230 to increase the resistance through the transistor. This causes a corresponding decrease in current through sense resistor 235. This resistance continues to increase to reduce the current flowing through sense resistor 235 until the voltage drop across sense resistor 235 is equal to the voltage provided by voltage source 210. This causes the input terminals of amplifier 220 to be at same voltage potential.

When the current passing through transistor 230 exceeds the current regulation limit, it is irrelevant how small the resistance is of load 225. Acting under control of amplifier 220, transistor 230 will supply all necessary resistance to cause the current to be limited to the current regulation limit.

Having current momentarily surpass the current regulation limit would typically occur if the load shorted or malfunctioned or if a short to ground was placed where the load should be. This, for example, could occur if someone were to connect the output terminals of the current limiting device with a paperclip instead of cell phone or pager. Then, the circuit of FIG. 2 would act to limit the current to the current regulation limit as dictated by the choice of voltage source 210 and sense resistor 235.

In light of this disclosure, it will be recognized by those skilled in the art that voltage source 210 could be created by configuring the devices in amplifier 220 to create an input offset. This offset would appear as a voltage difference such as voltage source 210. Through appropriate design of amplifier 220, a voltage difference corresponding to voltage source 210 could be chosen to set the current regulation limit of the circuit shown in FIG. 2.

Furthermore, while in FIG. 2, voltage source 200 and load 225 are shown each having one terminal grounded, it will be recognized by those skilled in the art that these terminals could be connected to a common voltage level other than ground or could be coupled through resistive networks to a common voltage level without departing from the spirit of this invention.

By way of example, keeping all the other components in FIG. 2 constant, increasing the voltage provided by voltage source 210 increases the amount of current that can be provided to the load without activating the current limiting function. Furthermore, keeping all other components equal, decreasing sense resistor 235 also allows more current to flow to the load without activating the current limiting function of the circuit. Thus in other embodiments of the invention, different current regulation limits could be chosen by varying either voltage source 210 or sense resistor 235.

Figure 3:
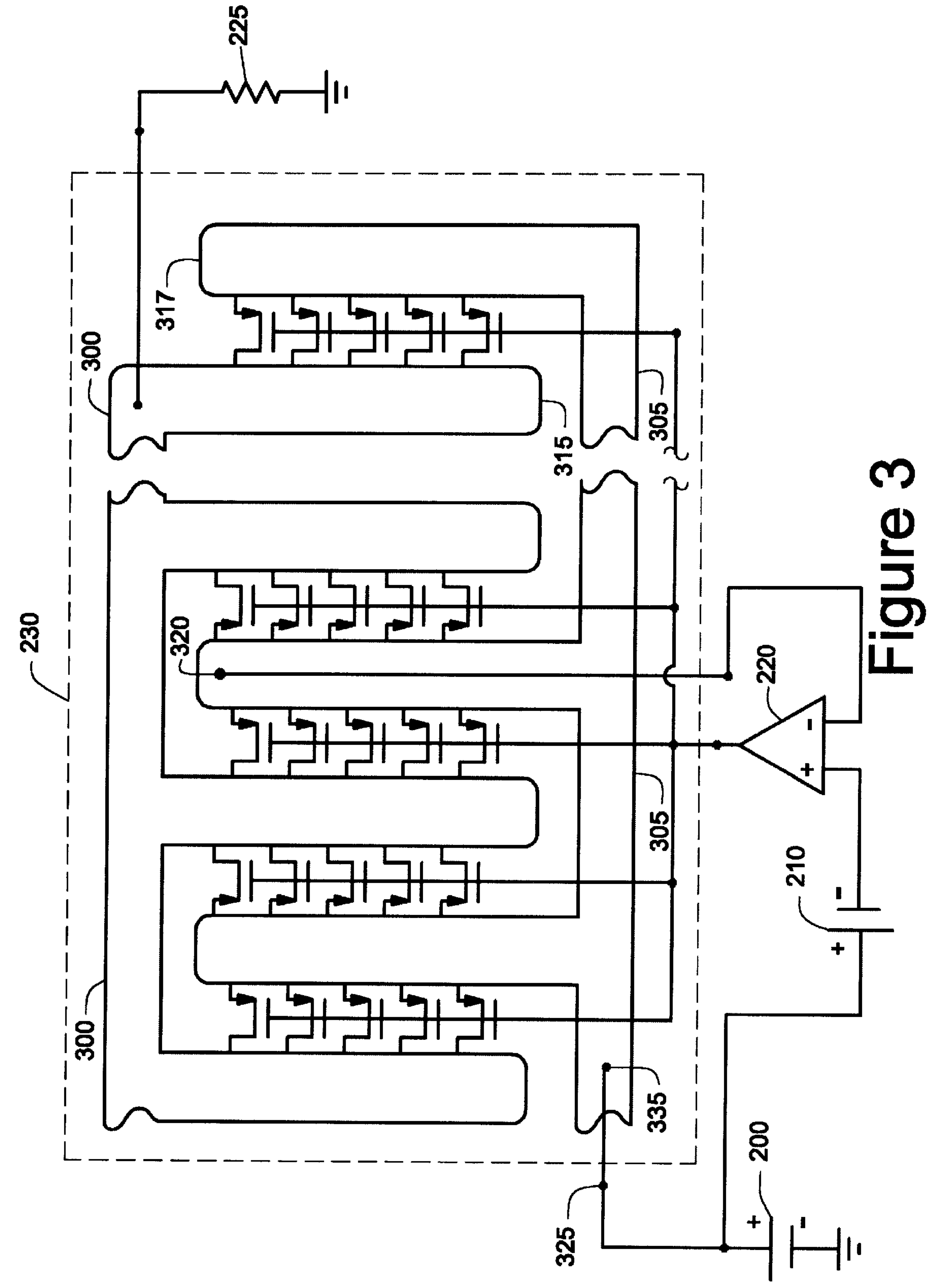
FIG. 3 is a diagram illustrating an enlarged view of the distributed components of a power transistor, according to one embodiment of the invention.
Figure 4:
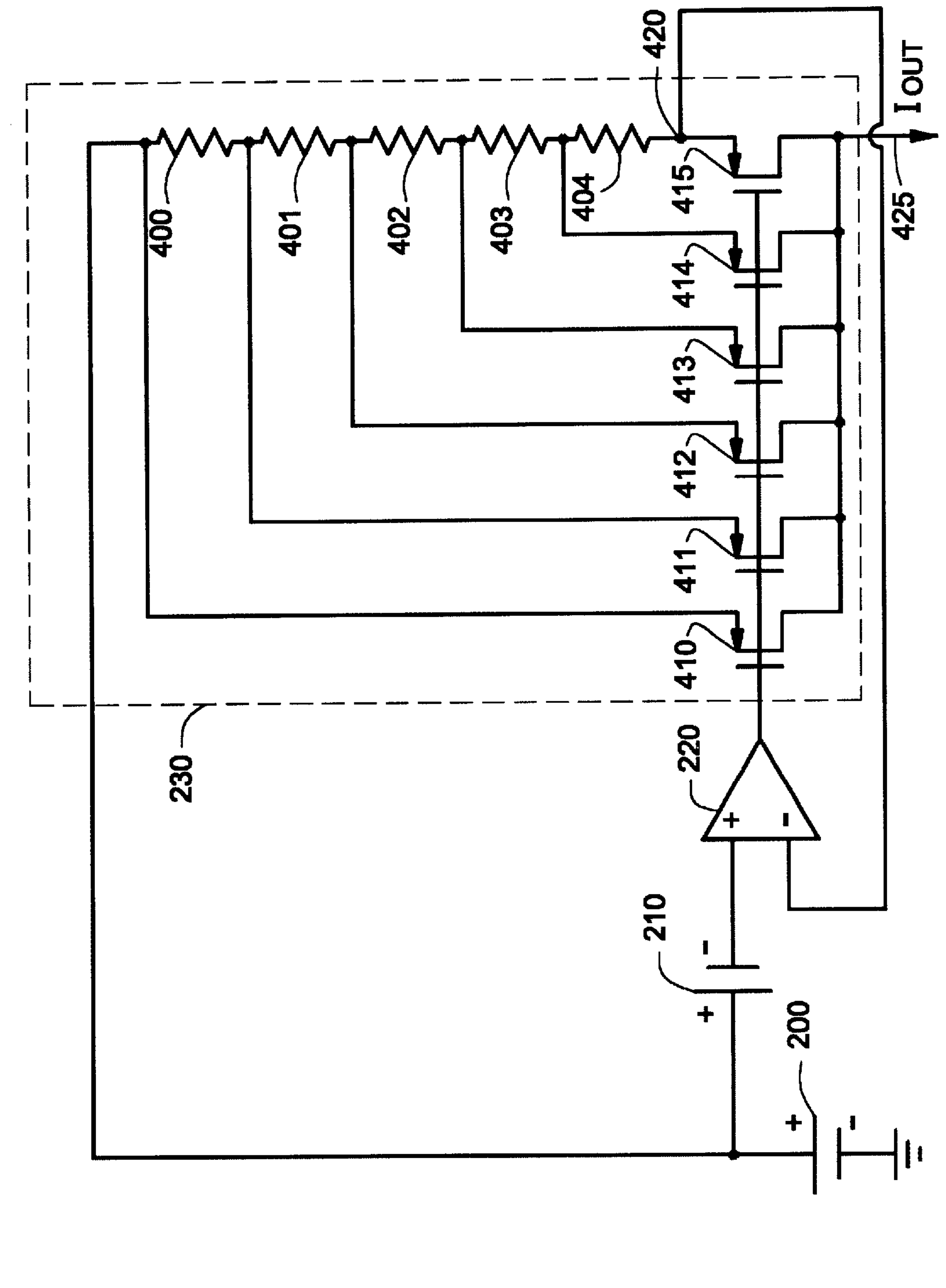
FIG. 4 is a circuit diagram illustrating the distributed nature of the resistance of metal interconnects a power transistor, according to one embodiment of the invention.

Because of the distributed nature of transistor 230 as described in detail in FIGS. 3 and 4, current passing through sense resistor 235 may create a voltage larger than, equal to, or smaller than the average voltage created by current passing through internal resistance 205. This voltage across sense resistor 235 is fed back to the amplifier controlling the transistor. Typically, a decrease in error in the regulation of current passing through the circuit of FIG. 2 requires a greater feedback signal to amplifier 220. Previously, more feedback was provided by increasing the size of a separate sense resistor that was in series with the transistor. Placing the sense resistor in series with the transistor increases the overall resistance in the current path of the regulating circuitry. Unfortunately, this has the disadvantage of decreasing the signal and power that reaches the load while increasing the heat dissipated in the regulating circuitry. By appropriate selection of a feedback signal from the resistance inherent in a transistor, this embodiment of the present invention provides the larger signal typically created by a larger sense resistor in series with the transistor without paying the penalties associated with having the larger sense resistor in series with the transistor.

With practically any high gain amplifier, low error in the regulation of current through the circuit of FIG. 2 can be maintained by choosing an appropriate sense resistor 235. For example, for a current of one amp and an error of 10%, sense resistor 235 is selected to provide a voltage signal of at least 20 millivolts when one amp of current is flowing through transistor 230.

FIG. 3 shows the components of FIG. 2 with distributed components of transistor 230 shown, according to one embodiment of the invention. Components numbered identical to those in FIG. 2 operate as described in conjunction with FIG. 2.

In FIG. 3, multiple transistors are connected to interdigitated strips of metal. According to this embodiment, metal 300 is configured to receive one voltage level, while metal 305 is configured to receive another voltage level. In essence, the transistors between the fingers (such as fingers 315 and 317) combine to implement a larger transistor capable of carrying more current.

Not shown in FIG. 3 are additional layers of metal often used in constructing power transistors. One purpose of such additional layers of metal is to distribute current to the distributed transistors of transistor 230 to decrease the on resistance of transistor 230.

Because metal 305 and finger 330 have resistance, current flowing through metal 305 and finger 330 creates a voltage difference between point 320 and point 325. By tapping finger 330 at point 320, the voltage difference between point 320 and point 325 provides a feedback signal to amplifier 220. Amplifier 220 uses this feedback to regulate current through transistor 230 as described in detail in conjunction with FIG. 2.

By selecting an appropriate point on a finger of transistor 230, one can vary the feedback signal provided to amplifier 220. In the embodiment shown in FIG. 3, for example, tapping finger 330 closer to metal 305 would tend to decrease the feedback signal to amplifier 220 while tapping finger 330 further away from metal 305 would tend to increase the feedback signal to amplifier 220. In some embodiments of the invention, however, moving tap point 320 closer to metal 305 increases the feedback signal until a second point is reached and then decreases the feedback signal as tap point 320 is moved even closer to metal 305, depending on the configuration of transistor 230. This might occur, for example, in a transistor with distributed components arranged in a triangular or circular pattern. This might also occur in transistors which distribute current, through other layers of metal for example, such that current is concentrated more densely at the ends of the fingers.

In light of this disclosure, those skilled in the art will recognize that circuit simulators, mathematical models, and the like can be used to determine a tap point to provide appropriate feedback for a particular application and transistor layout.

In this embodiment of the invention, metal, such as copper or aluminum, is used to connect to the transistors. In other embodiments, other conductive material are used to connect to the transistors such as polysilicon, doped silicon, and other materials known by those of ordinary skill in the art.

FIG. 4 shows components of FIG. 2 with distributed components of transistor 230 shown, according to another embodiment of the invention. Components numbered identical to those in FIG. 2 operate as described in conjunction with FIG. 2. Only a fraction of the distributed components in a typical power transistor are shown in transistor 230.

In FIG. 4, power transistor 230 can be modeled using resistors 400–404 and distributed transistors 410–415. Resistors 400–404 are formed from the inherent resistance of the interconnects supplying current to distributed transistors 400–415. To pass through the distributed transistors, current passes through a number of resistors. For example, current passing through distributed transistor 410 has no resistors to pass through, while current passing through distributed transistor 415 has five resistors to pass through.

This non-uniformity in resistance that current passes through to get to some distributed transistors is used to provide a greater feedback signal while maintaining a low on resistance. Specifically, to provide more feedback, tap point 420 is moved to a location in which current passes through more resistance. To provide less feedback, tap point 420 is moved to a location in which current passes through less resistance. While moving tap point 420 changes the feedback signal to amplifier 220, it does not change the on resistance of transistor 230. In essence, this means that a better feedback signal can be sent to amplifier 220 by appropriate tapping of its resistive structure without increasing the on resistance of transistor 230.

Simulations show that the voltage drop from the source terminal of transistor 230 to some of the distributed transistors is two or more times the average voltage drop from the source terminal of transistor 230 to the distributed transistors. This translates into a signal that is two or more times a feedback signal that would be generated by using the voltage across the average resistance of transistor 230.

Current output terminal 425 would sometimes be coupled to a load (not shown) such as a cell phone or pager. At other times, it would not be connected to anything. At still other times, it would be coupled to a faulty circuit with a short to ground or a device presenting a direct path to ground. Sometimes, it would be coupled to an overheating circuit attempting to draw more current.

In another embodiment, power source 200 would be a charging unit while current output terminal 425 would be coupled to a battery pack. This embodiment limits charging current received by the battery pack to a selected current regulation limit.

Replacing the sense transistor with the resistance inherent in the metal interconnects in a transistor has several advantages. First, it decreases the overall resistance between the power source and the load. Even when the transistor is full on, it will still have a resistance of the transistor plus the average resistance of the metal used to connect to the transistor. When a separate sense transistor is used, the overall resistance between the power source and the load increases by that of the sense resistor.

Decreasing the overall resistance between the power source and the load allows a higher voltage to reach the load to which the current limiter is supplying current. This can be critical in battery powered applications in which a solution of increasing the battery voltage supplied by using a larger, heavier battery is undesirable.

Another advantage of replacing the sense transistor with internal transistor resistance relates to the amount of current this type of resistor can accommodate. Resistors built on silicon that can accommodate a large amount of current typically require a large amount of real estate. By utilizing the metal resistance as a sense resistor, one avoids this problem.

Figure 5:
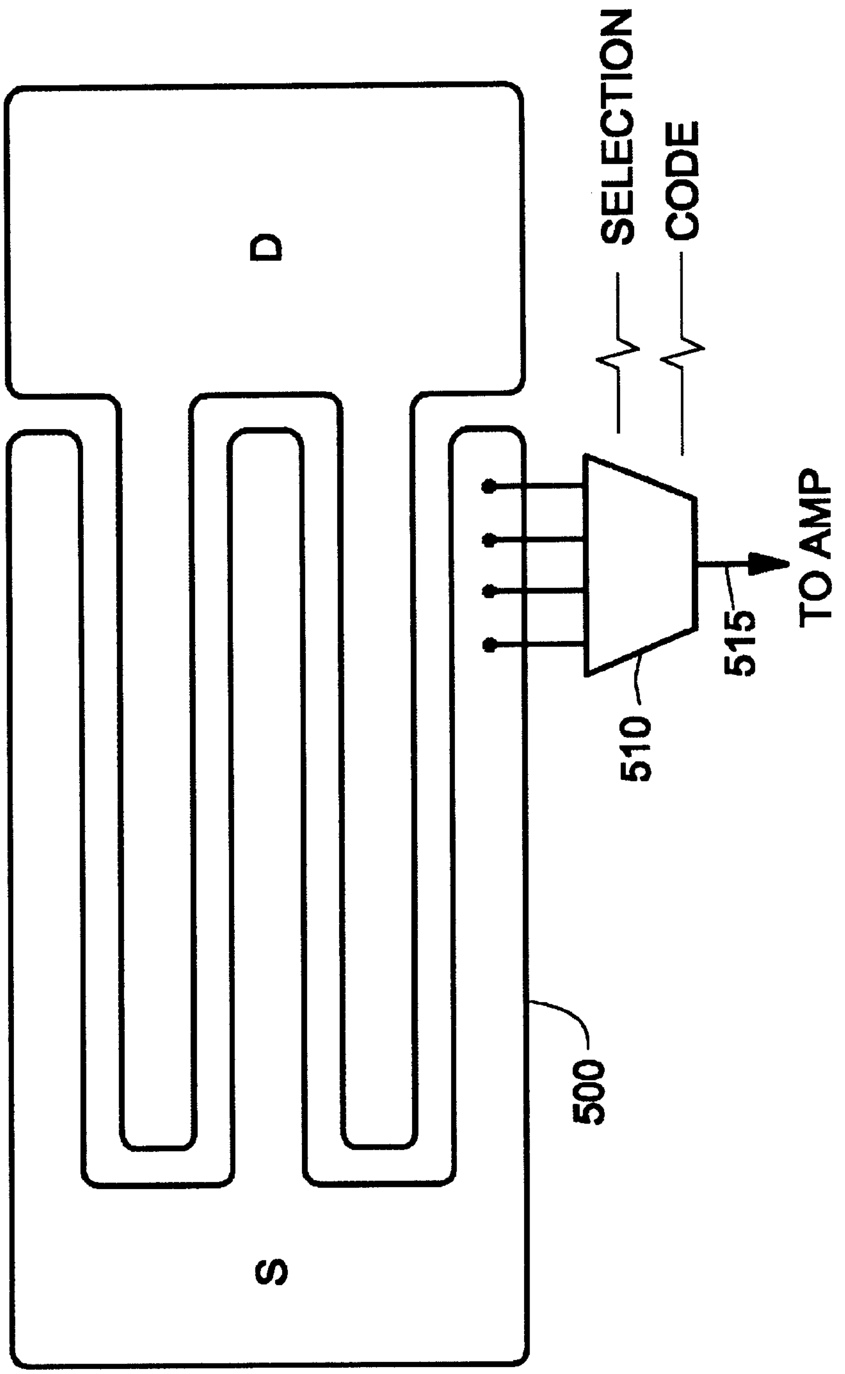
FIG. 5 is a diagram illustrating multiple connection points to a metal interconnect of a power transistor to provide a selectable amount of feedback to a monitoring circuit, according to another embodiment of the invention.

FIG. 5 shows another embodiment of the invention. In this embodiment of the invention, multiplexer 510 is connected to various parts of finger 500. The output of multiplexer 510, namely, terminal 515, could then be coupled to an amplifier or other controller (not shown) to provide feedback. With multiplexer 510 one is able to select the amount of feedback sent to a controller. This allows for coarse or fine adjustments to be made to the regulation current limit statically or dynamically.

In some embodiments of the invention, the circuit of FIG. 5 is used in applications that required a dynamically selectable current regulation limit. By using multiplexer 510, such applications select one current regulation limit at one time and another current regulation at another time to meet varying power requirements.

In other embodiments of the invention, the circuit of FIG. 5 could be used to make coarse or fine adjustments statically to a current regulation limit. A part could be constructed as an embodiment of the invention, for example, as an off-the-shelf current regulator configurable to several different current regulation limits. Typically, one using the part would determine the power required by the selected application and choose a current regulation limit accordingly. A fine adjustment would be used, for example, in adjusting the accuracy of the current regulation limit in the presence of process variations.

In the circuits shown in the FIGS. 2, 3, and 4, the transistors are p-channel field effect transistors (FETS). In light of this disclosure, alternative embodiments could be constructed, as recognized by those of ordinary skill in the art, using n-channel FETS or pnp or npn bipolar transistors.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A circuit for limiting current delivered to a load, the circuit comprising:

(a) a current limiter having a current sensor formed from an inherent first resistance in a field effect structure used to form the current limiter; and (b) a controller coupled to the current sensor, wherein the controller is configured to vary current conducted by the current limiter in response to a signal provided by the current sensor.

2. A circuit for limiting current delivered to a load, the circuit comprising:

(a) a current limiter having a current sensor formed from an inherent first resistance in a structure used to form the current limiter, wherein the inherent first resistance is coupled in parallel to an inherent third resistance of the structure, wherein the sum of the first and third resistances is equal to a total inherent resistance of the structure; and (b) a controller coupled to the current sensor, wherein the controller is configured to vary current conducted by the current limiter in response to a signal provided by the current sensor.

3. A circuit for limiting current delivered to a load, the circuit comprising:

(a) a current limiter having a current sensor formed from an inherent first resistance in a structure used to form the current limiter, and wherein the current sensor is distributed within the current limiter; and (b) a controller coupled to the current sensor, wherein the controller is configured to vary current conducted by the current limiter in response to a signal provided by the current sensor.

4. The circuit of claim 3 wherein the controller includes an amplifier.

5. The circuit of claim 4 wherein the current delivered to the load is limited by modifying the amplifier's input offset error.

6. The circuit of claim 4 wherein the current limiter comprises a transistor.

7. The circuit of claim 6 wherein the transistor is a field effect transistor.

8. The circuit of claim 7 wherein the transistor is a p-channel device.

9. The circuit of claim 6 wherein the load comprises a battery.

10. The circuit of claim 4, wherein the first resistance is formed by tapping at a first point of the structure a conductive interconnect supplying power to distributed components of the transistor.

11. The circuit of claim 10 further comprising:

(a) a second resistance formed by tapping the conductive interconnect at a second point; and (b) a selecting device structured to receive a selection signal and to select the first resistance or the second resistance to be used as the current sensor.

12. The circuit of claim 4 wherein the controller, the current sensor, the current limiter, and the load are all contained on a single monolithic integrated circuit.

13. The circuit of claim 12 wherein the controller is coupled to a microprocessor.

14. A circuit for limiting current to a load, the circuit comprising (a) a current limiter including means for sensing current, means for receiving input from a controller, and means for varying current passed through the current limiter responsive to the input from the controller, wherein the means for sensing current is formed from an inherent first resistance in a structure used to form the current limiter; and (b) the controller with means for receiving input from the means for sensing current and means for controlling the current limiter to vary current through the current limiter in response to a current sensed by the current limiter's means for sensing current.

15. The circuit of claim 14 wherein the first resistance is formed by tapping a conductive interconnect in the current limiter at a first point.

16. The circuit of claim 17 further comprising:

(a) a second resistance formed by tapping the conductive interconnect at a second point;

(b)) a selecting means for receiving a selection signal and selecting the first resistance or the second resistance to be used as the means for sensing current.

17. A circuit for limiting current comprising:

(a) a transistor comprising a first and a second terminal, a control terminal, and a sense resistor, wherein the sense resistor comprises a first terminal and a second terminal, wherein the sense resistor is formed from an inherent resistance of a structure forming the transistor, wherein the first terminal of the transistor is coupled to a second voltage source, and wherein the second terminal of the transistor is structured to deliver current to another device;

(b) a first voltage source comprising a first and a second terminal, the first terminal of the first voltage source being coupled to the first terminal of the sense resistor; and (c) an amplifier comprising two input terminals and an output terminal wherein the first input terminal is coupled to the second terminal of the first voltage source, the second input terminal is coupled to the second terminal of the sense resistor, and the output terminal is coupled to the control terminal of the transistor.

18. The circuit of claim 17 wherein the transistor further comprises a plurality of interdigitated fingers, one of which is tapped to provide the sense resistor.

19. The circuit of claim 18 wherein an interdigitated finger is tapped at several points to provide a plurality of dynamically selectable sense resistors.

20. The circuit of claim 19 further comprising a selecting device structured to receive a selection signal and to select one of the plurality of selectable sense resistors responsive to the selection signal.

21. A circuit for limiting current delivered to a load, the circuit comprising:

(a) a current limiter structured to conduct a current, wherein the current limiter includes a transistor, wherein a first current sensor is formed by tapping an internal structure of the transistor, wherein the first current sensor has a substantially fixed resistance; and (b) a controller coupled to the current sensor, wherein the controller is configured:

(i) to drive the transistor full on when the current sensor indicates that the current conducted through the current limiter is below a value, and (ii) to drive the transistor to limit the current conducted through the current limiter to the value when the current sensor indicates that the current conducted through the current limiter is equal to or greater than the value.

22. The circuit of claim 21, wherein the transistor comprises a source terminal and a drain terminal configured such that when the current is conducted through the current limiter, the current sensor provides a greater signal than generated across the source and drain terminals.

23. The circuit of claim 21, wherein the internal structure comprises a plurality of interdigitated fingers that supply power to distributed components of the transistor.

24. The circuit of claim 23, wherein the internal structure that is tapped is one of the plurality of interdigitated fingers.

25. The circuit of claim 24, further comprising:

(a) a second current sensor formed by tapping one of the plurality of intedigitated fingers; and (b) a selecting device coupled to the first and second current sensors, the selecting device structured to receive a selection signal and to select at least one of the first and second current sensors to provide a signal to the controller.

* * * * *

UNITED STATES PATENT AND TRADEMARK OFFICE

CERTIFICATE OF CORRECTION

PATENT NO. : 6,496,345 B1 
DATED : December 17, 2002
INVENTOR(S) : Smith

It is certified that error appears in the above-identified patent and that said Letters Patent is hereby corrected as shown below:

<u>Column 7,</u>
Line 48, "an inherent first resistance in a field effect structure" should read -- a substantially fixed first resistance in a field effect structure --
Line 58, "an inherent first resistance in a structure used to form" should read -- a substantially fixed first resistance in a structure used to form --

<u>Column 8,</u>
Line 58, "an inherent first resistance in a structure used to form" should read -- a substantially fixed first resistance in a structure used to form --
Line 24, "The circuit of claim 4," should read -- The circuit of claim 6, --
Lines 46-47, "means for sensing current is formed from an inherent first resistance" should read -- means for sensing current is formed from a substantially fixed first resistance --
Line 57, "The circuit of claim 17" should read -- The circuit of claim 15 --
Line 60, "(b)) a selecting means for receiving" should read -- (b) a selecting means for receiving --

<u>Column 8, line 67 - Column 9, line 1,</u>
"wherein the sense resistor is formed from an inherent resistance of a structure" should read -- wherein the sense resistor is formed from a substantially fixed resistance of a structure --

<u>Column 10,</u>
Line 1, "internal structure of the transistor, wherein the first" should read -- internal structure of the transistor, and wherein the first --

Signed and Sealed this

Fifteenth Day of July, 2003

JAMES E. ROGAN
*Director of the United States Patent and Trademark Office*